April 5, 1966 G. S. SHEETS 3,244,392
INDICATOR HOLDER
Filed Aug. 31, 1964 2 Sheets-Sheet 1
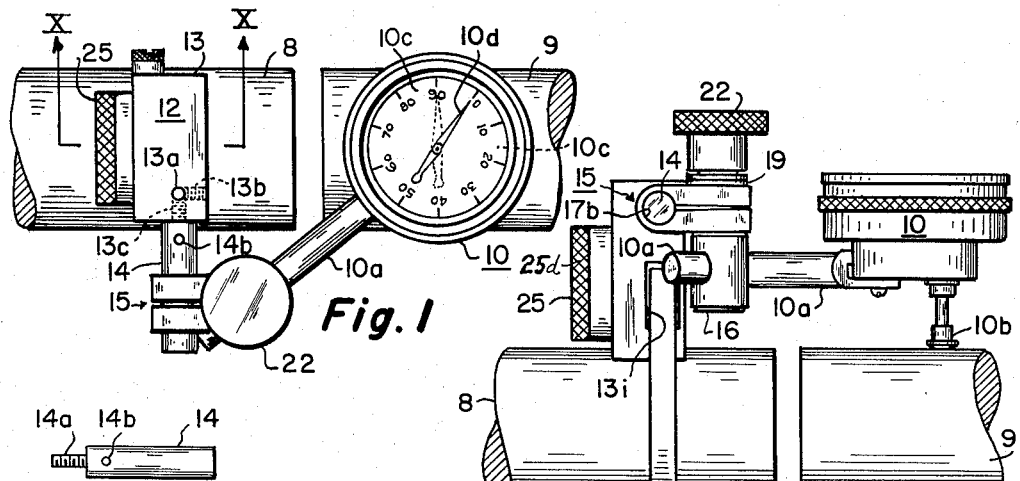
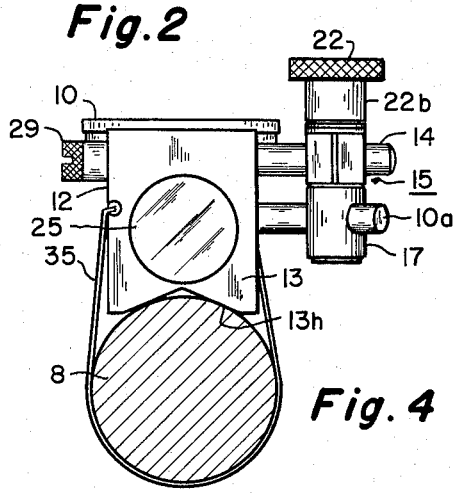
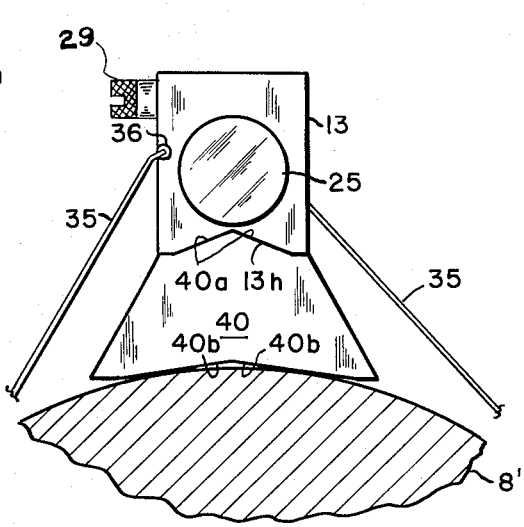
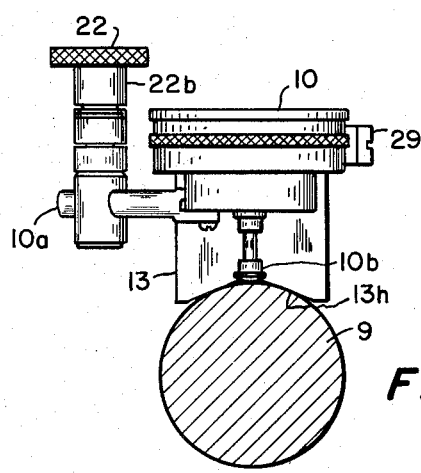
INVENTOR.
Gaylord S. Sheets
BY Green, McCallister & Miller
HIS ATTORNEYS April 5, 1966   G. S. SHEETS   3,244,392
INDICATOR HOLDER Filed Aug. 31, 1964   2 Sheets-Sheet 2

INVENTOR.
Gaylord S. Sheets
BY Green, McCallister & Miller
HIS ATTORNEYS

United States Patent Office 3,244,392
Patented Apr. 5, 1966

3,244,392
INDICATOR HOLDER
Gaylord S. Sheets, 3213 46th St., New Brighton, Pa.
Filed Aug. 31, 1964, Ser. No. 393,062
10 Claims. (Cl. 248—231)

This invention relates to a device for aligning shafts and particularly, to a mounting holder, support means or positioning device for an indicating or aligning instrument used in aligning a pair of shafts or the like.

Previous to my invention, there have been various forms of mounting holders or devices, but such devices have been deficient from the standpoint of their lack of flexibility and adaptability of utilization for aligning shafts of a range of diameters, and have been complex in their shaft securing means for the test indicator.

The present invention relates particularly to a solution to this problem, in the sense of devising a holder, unit or device that will be readily adaptable to a wide range of shaft or member size utilizations, that will be simple in construction and operation, and that will be positive and secure in its holding action.

It has thus been an object of my invention to devise a new and improved form of indicator holder for shaft-aligning utilization and particularly, to solve the problem heretofore presented in providing a device that will have clamping or gripping-mounting means that readily adapts it to various diameters or sizes of shaft members;

Another object of my invention has been to develop an improved device or holder which will be simple in construction and utilization and will take up a minimum of space in a mechanic's tool box;

A further object of my invention has been to provide a readily adaptable holder for a shaft alignment indicating device that will occupy a minimum of space when not in use, and that will be of such a nature that it cannot be readily damaged or entwined with other tools in a tool box;

These and other objects of my invention will appear to those skilled in the art from the described embodiment and the claims.

In the drawings:

FIGURE 1 is a top plan view of a device or holder of my invention, as utilized with an indicator device, shown as a dial test indicator, for aligning a pair of shaft members;

FIGURE 2 is a side view in elevation on the scale of FIGURE 1 showing details of the construction of a mounting pin of the construction of FIGURE 1;

FIGURE 3 is a side view in elevation on the scale of and of the structure of FIGURE 1;

FIGURE 4 is an end section on the scale of FIGURE 1 showing the left-hand shaft, and taken to the left from an intermediate position of the structure of FIGURE 1 to particularly illustrate my holder device;

FIGURE 5 is a somewhat diagrammatic view in elevation and partial section on the scale of FIGURE 1, illustrating the employment of an adaptor part which may be used, if desired, when an extremely large size shaft member is being aligned;

FIGURE 6 is an end view in elevation taken from the right-hand end of the structure of and on the same scale as FIGURES 1 and 3;

Figure 7:
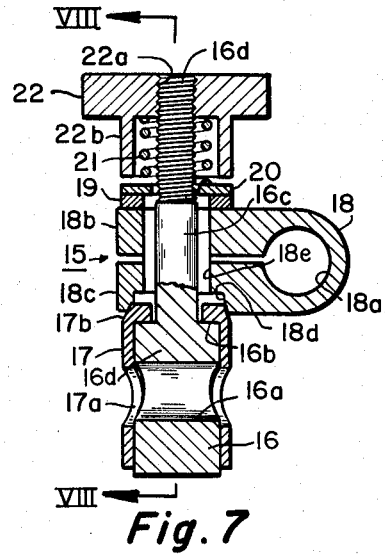
FIGURE 7 is an enlarged vertical section in elevation illustrating the construction of a pivotal connecting unit employed in the construction of FIGURES 1, 3, and 4.

Referring particularly to FIGURES 1, 3, 4, and 6, I have shown a pair of shaft members 8 and 9 that are to be accurately aligned with respect to each other, as determined by an indicator gauge 10, shown as a dial test indicator. A mounting rod 10a projects from a side bottom portion of the indicator 10 for holding it accurately in position with respect to one shaft 9 which is to be aligned with a second shaft 8 that carries a mounting holder device or unit of my invention. The indicator gauge 10 may be of any suitable commercial type, such as produced by L. S. Starrett Company of Athol, Massachusetts. The indicator 10 illustrated is a .001 Jeweled #196 that is provided with a feeler or contact button 10b. The button 10b is adapted to engage the surface of the shaft 9 to show by a dial finger 10d whether or not the shaft 9 is aligned with the shaft 8. In FIGURE 1, I have illustrated a misalignment by a dotted line position of the finger 10d and a fully aligned pair of shafts by the solid line position of the finger 10d. The indicator 10 has a deflection-indicating face 10c provided with the usual deflection markings or graduations thereon.

Holder device or unit 12 is provided with a substantially rectangular-shaped block body 13 having threaded bore holes 13a, 13b, and 13c open to one side face, to its top face, and to one end face to removably-receive a mounting pin 14. As shown particularly in FIGURES 1 and 2, the mounting pin 14 has a reduced, threaded stud or end portion 14a of smaller diameter for removably-mounting it in one of the threaded bores 13a, 13b, or 13c, as may be desirable for a particular alignment job. In FIGURE 1, the pin 14 is shown mounted in the threaded bore hole 13c to extend from an end face of the block or body 13. A cross-bore or hole 14b is shown extending through the pin 14 for the insertion of a rod or tool to aid in tightening it in its mounted position and in removing it from its mounted position with respect to the block body 13.

A pivotal connector part or unit 15 is provided which enables adjustment of the angular relationship between the block 13 and the indicator 10; it removably secures them in a connected relation for a particular gauging job. The construction of the part 15 is shown particularly in FIGURES 7, 8, and 9 of the drawings. It will be noted that it has an axially-projecting central post, stem or spindle shaft 16 which has an intermediate or central shaft portion 16c that extends through a bifurcated clamping part or bracket 18. The clamping part 18 is adapted to mount the indicator 10 by removably-receiving and clamping the pin 14 within a transverse bore 18a. It will be noted from FIGURES 1, 3, and 4 that the pin 14 extends through the bore 18a and that bifurcated leg portions 18b and 18c have a vertical bore 18e therethrough at right angles to the bore 18a to by-pass the central shaft portion 16c of the spindle 16. The lower end 16d of the spindle 16 has an enlarged cylindrical end body provided with a transverse through-bore 16a for slidablyremovably-receiving and positioning the side-extending mounting rod 10a of the indicator 10.

A cylindrical outer slide sleeve 17 substantially encloses the lower end portion of the spindle 16 and has a slide-fitted relation thereover for endwise movement with respect thereto. In this connection, the sleeve 17 has a transverse through-bore 17a that is adapted to substantially align with the bore 16a to by-pass the end portion of the rod 10a therethrough. However, the sleeve 17 is adapted to move with respect to the spindle 16 when the unit 15 is tightened-down to securely hold the rod 10a in a clamped position within the bore 16a by reason of a slight misalignment of the bore 17a with respect thereto. The sleeve 17, at its upper end, has a turned-in rim or flange portion 17b which cooperates with an inwardly-offset shoulder or abutment portion 16b of the spindle 16 to limit the maximum downward or outward movement of the sleeve 17 and to retain it in an operating position on the spindle 16. The flange or rim portion 17b also has a wedge-shaped or beveled outer edge portion which cooperates with a complementary, sloped, inner peripheral portion of an enlarged bottom bore 18d in the leg portions 18c to, when the unit 15 is tightened-down, cause the wall of the bore 17a of the sleeve 17 to move out of alignment with the bore 16a and tightly clamp or hold mounting pin 14 in position.

Figure 8:
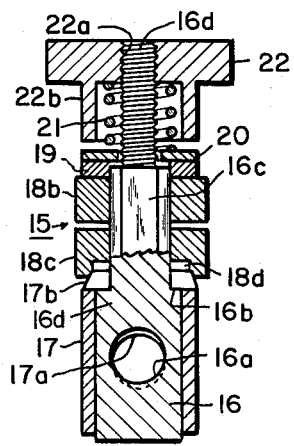
FIGURE 8 is a view similar to and on the scale of FIGURE 7, taken at right angles thereto along the line VIII—VIII.
Figure 9:
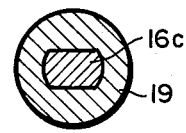
FIGURE 9 is a horizontal section taken through spindle and locking washer parts of the construction of FIGURES 7 and 8, with the parts in the relationship of such figures and on the same scale as such figures.

As shown in FIGURES 8 and 9, the central shaft portion 16c of the spindle 16 has opposed flattened sides which are engaged by a lock washer 19 having a hole therein corresponding to such sides and to the opposed curvilinear sides so as to maintain the washer 19 in a fixed position on the spindle 16 for turning movement therewith. A second or upper washer 20 is loosely positioned on a threaded cylindrical upper end or stem portion 16d of the spindle 16 to abut the lock washer 19 and to position a lower or inner end of a spiral tension spring 21. The other end of the spring 21 is adapted to engage within an end portion of an operating knob 22 and to lie within or to be substantially enclosed by a downwardly-projecting annular skirt portion 22b of the knob 22.

As shown particularly in FIGURES 7 and 8, the knob 22 has a threaded bore 22a, so that it may be turned inwardly and outwardly along the threaded stem portion 16d against tension force offered by the spring 21 to clamp and unclamp the portion 18 with respect to the mounting pin 14 and the sleeve 17 with respect to the rod 10a. The arrangement is such that before the pivot connector 15 is tightened-down by screwing-down the operating knob 22, the angular relationship between the pin 14 and the rod 10a may be suitably adjusted, for example, to attain the illustrated relationship of FIGURES 1 and 3. The tightening-down of the knob 22 simultaneously secures the unit 15 in its adjusted pivoted relation and secures the rod 10a in position.

In FIGURE 7, the sleeve 17 is shown in its maximum "down" position, as resiliently held by tension force of the spring 21. At this time, the rod 10a and the pin 14 may be inserted or removed from within the bore 16a by flexing the spring. However, when the operating knob 22 is turned downwardly on the thread stem 16d to compress the spring 21 until the lower end of the skirt portion 22b abuts the washer 20, the sleeve 17 and the clamping part 18 are then fully tightened-down to tightly secure the unit 15 on the pin 14 and the rod 10a.

Figure 10:
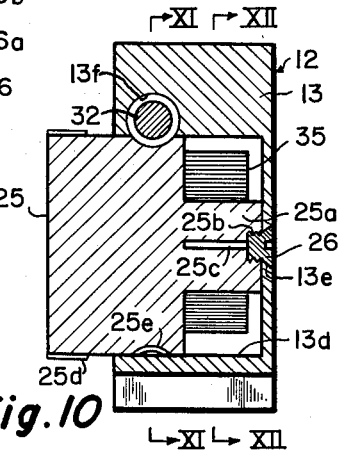
FIGURE 10 is a vertical section on the scale of FIGURES 7 and 9, taken along the line X—X of FIGURE 1.
Figure 11:
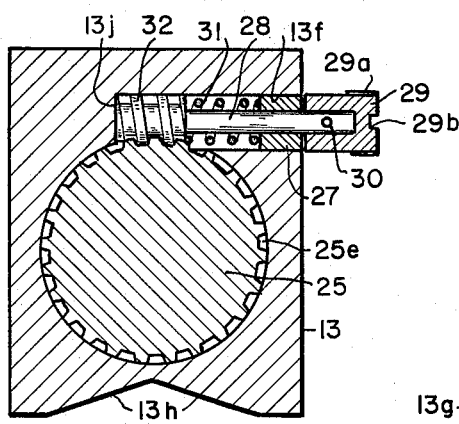
FIGURE 11 is a vertical section on the scale of FIGURE 10 and taken along the line XI—XI thereof.
Figure 12:
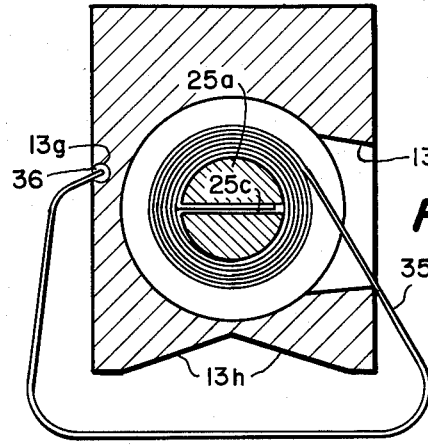
FIGURE 12 is an end section on the scale of FIGURES 10 and 11 and taken along the line XII—XII of FIGURE 10.

The block or body 13, as shown particularly in FIGURES 10 and 11, has a cylindrical bore or chamber 13d therein that is open to its back side to slidably-receive and rotatably-position a winding means 25 having an operating knob or annulus 25d that is integral with a spool or winding cylinder portion 25a of reduced diameter. As shown particularly in FIGURE 10, the winding means 25 is rotatably or turnably carried within the block 13 by means of a tapered-head set or mounting screw 26 that projects inwardly from an opposite side of the block body 13. The inner cylindrical end portion of the screw 26 is threaded to engage within a threaded bore 25b of the spool portion 25a. It will be noted that the outer portion of the set screw 26 is of frusto-conical shape that is complementary with a bore portion 13e in the block 13. The inner cylindrical portion 25a of the winding means 25 is of reduced diameter for winding up and unwinding a clamping tape, band or strap member 35 of a suitable length that is preferably of strong, flexible steel construction and may have a slight "spring-set" in it. The inner end portion of the strap or band member 35 is, as shown in FIGURE 12, removably-mounted in a slitted or slotted end portion 25c of the spool 25a. The portion 25c is in axial alignment with the bores 25b and 13e.

Figure 13:
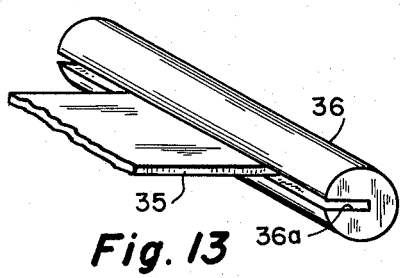
FIGURE 13 is a greatly enlarged fragmental perspective view illustrating a mounting pin employed for the end of a clamping strap or band member of my construction.

The strap member 35 is adapted to extend outwardly through an end opening or window portion 13i (see FIGURE 12) in an end of the block 13 and is provided with a front end mounting means or pin 36. As shown particularly in FIGURE 13, the other or forward end of the strap member 35 may be clamped within a longitudinal slit portion 36a of the pin 36. When the strap member 35 is in its encircling or enclosed loop defining, shaft clamping position of FIGURE 4 and in its retracted or withdrawn position of FIGURE 12, its end pin 36 may be carried or removably-secured within a transverse slot 13g in the opposite end of the block 13. In this connection, the pin 36 is adapted to be inserted in the slot 13g in an endwise relation, so that it cannot be pulled forwardly-outwardly thereof when the loop of the member 35 is clamping the shaft 8, as shown in FIGURE 4.

The winding means 25 is provided with a knurled outer peripheral knob portion 25d as shown in FIGURES 3 and 10 for turning it within the block 14 for the purpose of winding-up and unwinding the clamping band or strap member 35. The strap or band 35 may be pulled-out and unwound, provided that a locking means, shown particularly in FIGURE 11, is moved or pulled-out to its unlocked or unlatched position. The amount of extension or pull-out of the strap member 35 will depend upon the diameter of the shaft 8 upon which it is to be clamped. The band 35 will normally be employed by removing its pin 36 endwise from the slot 13g and then pulling it straight-outwardly to wrap or loop it around the shaft 8. At this time, the pin 36 will be inserted in the slot 13g, in order that the band 35 will form a closed loop about the shaft 8. The locking means may then be released or moved inwardly to again latch-engage or mesh with the winding means 25. The knob 25d may then be turned (counterclockwise in the construction shown) to tighten the strap member 35 securely in a clamping position about the shaft 8.

It will be noted that the winding cylinder 25a has gear teeth 25e in the nature of worm wheel teeth about its outer periphery within the block 13 to engage, mesh or cooperate with a worm gear 32 that is secured to the inner end of a locking pin shaft 28 (see FIGURES 10 and 11). A suitable gear ratio between the worm gear 32 and the worm wheel teeth 25e is about 15 to 1. For operating the shaft 28, a head or knob 29 is secured on its forward end by a through-pin 30. As shown in FIGURE 11, the head 29 has a knurled portion 29a and a screw driver slot 29b. An open-end bore 13f in the block body 13 carries a bearing sleeve 27 in a tightly secured relation therein to rotatably and slidably receive the lock shaft 28. A spiral compression spring 31 abuts at one end against the bearing sleeve 27 and at its other end against the worm gear 32 to normally urge the pin and the worm gear towards and hold them in an engaging or meshing operating position (shown in FIGURE 11) with the gear teeth 25e. The spring 31 permits the worm 32 to be withdrawn or pulled outwardly from meshing or latching engagement with the teeth 25e to permit the knob 25d to be turned in either direction when the band 35 is to be released. This is accomplished by merely pulling out the head 29 and compressing the spring 31.

It will be apparent that when the band 35 is given a rough, somewhat loose, positioning over the shaft 8 that it can then be tightened into a secure position by turning the knob 25d (counterclockwise in the construction shown). When the knob 25d is turned in this manner, it causes the shaft 28 to be moved outwardly against the tension force of the spring 31; turning the knob 25d in this manner causes the worm to click-out of gear teeth engagement against the resiliency of the spring 31, and to then immediately return inwardly into locking engagement and into endwise abutment with an end wall 13j of the bore 13f when the knob 25d is released to thus hold the strap 35 in a tightened relation about the shaft 8. That is, when the counterclockwise movement of the winding means 25 is released, or an attempt is made to turn it clockwise, the spring resiliently holds the shaft 28 inwardly to lock the gear teeth 25e with the worm 32 and prevent clockwise movement of the winding cylinder or spool 25a. The worm gear 32 when in its position of FIGURE 11 serves as a safety latch or lock to prevent an opposite turning (clockwise in the constructtion shown) which would release the clamping action of the band about the shaft 8. The head 29, its shaft 28 and the worm 32 may be turned counterclockwise, the knob 25d may be turned clockwise or the band 35 may be pulled outwardly (by holding the shaft 28 in its "out" position) to relieve the clamping action of the band 35 when the mounting holder 12 is to be removed from the shaft 8.

In FIGURE 5, I have illustrated an adaptor block or extension member 40 that may be employed where an exceptionally large size or diameter of shaft 8' is to be aligned. The adaptor member 40 has an upper edge or face provided with a convex, angular offset portion 40a that fits in a complementing manner within a concave, angular, offset or V-shaped edge or face portion 13h of the block 13a. As shown in FIGURE 4, the face portion 13h is normally adapted to rest upon or engage the shaft 8 as a backing-up wedge face having sloped portions making opposed tangential contact with a peripheral side portion thereof. The adaptor 40 thus has a concave, V-shaped, angular edge or face portion 40b of wider extent and lesser slope to provide a greater area of shaft engagement for a much larger shaft 8'. The adaptor may be merely clamped in position in alignment with the block body 13 when it is used.

A small unit 12 of, for example, an actual scale size shown in FIGURES 1 and 4, may be used for a large range of shaft sizes up to about 18 inches in diameter, in that the spool or cylinder 25a will carry about a 60 inch length of strap member 35 within the bore of the block 13.

In employing my mounting holder 12, I prefer to provide a set of the mounting pins 14 of different lengths in order to readily adapt the holder to the requirements of different aligning jobs. Although I have shown details of the connector 15 for the purpose of illustration, it will be apparent that any suitable commercial type of connector unit may be employed.

Although for the purpose of illustration I have shown and described an embodiment of my invention, it will be apparent to those skilled in the art that various changes and modifications may be made thereto without departing from the spirit and scope of the invention as indicated by the appended claims.

What I claim is:

1. In a mounting holder for an alignment indicator that is adapted to engage one shaft member of a pair of shaft members that are to be aligned with each other, a block body for carrying the indicator and adapted to be removably-positioned on the other shaft, winding means rotatably-carried by said block body, a strap member secured at one end on said winding means and having an opposite end extending from said block body to encircle the other shaft, means for securing the other end of said strap member on said block body to define a loop about the other shaft, said winding means having means for rotating it in opposite directions to wind up and unwind said strap member for decreasing and increasing the size of said loop, and pin means operatively-carried by said block body and having latching means, said pin means having means for moving said latching means into latching engagement with said winding means to lock said winding means against unwinding rotation when said strap member is rotatable in one direction into tight clamping relation about the other shaft, and said latching means being constructed to move out of latching engagement with said winding means when said winding means is to be rotated in an opposite direction to unwind said strap member.

2. In a mounting holder for an alignment indicator that is adapted to engage one shaft member of a pair of shaft members that are to be aligned with each other, a block body for carrying the indicator and adapted to be removably-positioned on the other shaft, winding means rotatably-carried by said block body, a strap member secured at one end on said winding means and having an opposite end extending from said block body to encircle the other shaft, means for securing the other end of said strap member on said block body to define a loop about the other shaft, said winding means having means for rotating it in opposite directions to wind up and unwind said strap member for decreasing and increasing the size of said loop, means operatively-associated with said winding means for locking it against unwinding rotation in a desired position at which said strap member is in a tight clamping relation about the other shaft for holding said block body in a secure position thereon, said locking means being operatively-carried by said block body and having means engaging said winding means to permit winding up and prevent unwinding rotation thereof, said locking means having resilient means normally urging said last-mentioned means into engagement with said winding means, and said locking means having manual means for moving it in opposition to said resilient means out of engagement with said winding means to permit both winding up and unwinding rotation of said winding means.

3. In a mounting holder for an alignment indicator that is adapted to engage one shaft member of a pair of shaft members that are to be aligned with each other, a block body for carrying the indicator and adapted to be removably-positioned on the other shaft, winding means rotatably-carried by said block body, a strap member secured at one end of said winding means and having an opposite end extending from said block body to encircle the other shaft, means for securing the other end of said strap member on said block body to define a loop about the other shaft, said winding means having means for rotating it in opposite directions to wind up and unwind said strap member for decreasing and increasing the size of said loop, means operatively-associated with said winding means for locking it against unwinding rotation in a desired position at which said strap member is in a tight clamping relation about the other shaft for holding said block body in a secure position thereon, said winding means having a winding cylinder operatively-positioned for rotation within said block body, said locking means having a worm shaft operatively-carried by said block body for meshing engagement with said winding cylinder, and said worm shaft having means for moving it into and out of meshing engagement with said winding cylinder.

4. In a mounting holder for an alignment indicator that is adapted to engage one shaft member of a pair of shaft members that are to be aligned with each other, a block body for carrying the indicator and adapted to be removably-positioned on the other shaft, winding means rotatably-carried by said block body, a strap member secured at one end on said winding means and having an opposite end extending from said block body to encircle the other shaft, means for securing the other end of said strap member on said block body to define a loop about the other shaft, said winding means having means for rotating it in opposite directions to wind up and unwind said strap member for decreasing and increasing the size of said loop, means operatively-associated with said winding means for locking it against unwinding rotation in a desired position at which said strap member is in a tight clamping relation about the other shaft for holding said block body in a secure position thereon, said block body having a concave face to engage the other shaft member, an adaptor member having a V-groove face to engage the other shaft member, and said adaptor member having a complementary convex face to engage within the V-groove face of said block body to define an adaptor extension when mounted between said block body and the other shaft.

5. In a mounting holder for an alignment indicator that is adapted to engage one shaft member of a pair of shaft members that are to be aligned with each other, a block body having an offset face for removable-positioning on the other shaft, connector means adapted to be removably-secured to said block body for carrying the alignment indicator in engagement with the one shaft, said block body having a cylindrical bore therein, an operating knob having a winding cylinder operatively positioned for turning movement within said bore, a strap member secured to one end for winding up and unwinding movement on said winding cylinder, a window portion in said block body through which said strap member extends outwardly, the other end of said strap member being adapted to be moved into an encircling relation about the other shaft member, means on the other end of said strap member for removably-securing it on said block body when said strap member has encircled the other shaft member, said operating knob being constructed to be turned to wind up said strap member within said block body and tighten said strap member securely in a clamping relation about the other shaft member for securely positioning said block body on the other shaft member, said winding cylinder having gear teeth about its periphery, a shaft having a worm gear, said shaft being operatively-positioned for in and out movement within said block body to mesh said worm gear with said gear teeth in its "in" position and to disengage said worm gear from said gear teeth in its "out" positions, means resiliently holding said worm gear in meshing engagement with said gear teeth in such a manner that said winding cylinder can be turned in a direction to wind up said strap member and that said winding cylinder will be locked in a desired wound up position against unwinding movement, and said shaft having means for moving it outwardly with respect to said block body to disengage said worm gear with respect to gear teeth whereby said winding cylinder may be turned in an unwinding direction.

6. In a mounting holder as defined in claim 5 wherein, said block body has a transverse slotted portion in a face thereof opposite to the open window portion thereof, and said means on the other end of said strap member is a pin adapted to be slid into and out of an engaging relation within said slotted portion.

7. In a mounting holder as defined in claim 5 wherein, said operating knob carries said winding cylinder as an integral part thereof and projects from a side of said block body for manual turning movement with respect thereto, and a mounting screw projects inwardly from an opposite side of said block body for removably-securing said winding cylinder for turning movement within said cylindrical bore.

8. In a mounting holder for an alignment indicator as defined in claim 5 wherein, said block body has threaded bore holes open to different faces thereof, a mounting pin is adapted to be removably-secured in one of said threaded bore holes to project therefrom, and said pivotal connector is adapted to receive said mounting pin therein to carry the alignment indicator on said pin.

9. In a mounting holder for an alignment indicator that is adapted to engage one shaft member of a pair of shaft members that are to be aligned with each other, a block body for carrying the indicator and adapted to be removably-positioned on the other shaft, an open-end bore in said block body, winding means rotatably-mounted in said bore, a strap member secured at one end on said winding means and having an opposite end extending from said block body to encircle the other shaft, means for removably-securing the other end of said strap member on said block body to define a loop about the other shaft, said winding means having a knob for rotating it in opposite directions to wind up and unwind said strap member for decreasing and increasing the size of said loop, stem means operatively-mounted to extend within said block into engagement with said winding means for locking it against unwinding rotation in a position at which said strap member is in a tight clamping relation about the other shaft for holding said block body in a secure position therein, and said stem means having manual means for moving it out of engagement with said winding means whereby said winding means may be unwound to release the holding action of said strap member with respect to the other shaft.

10. In a mounting holder for an alignment indicator that is adapted to engage one shaft member of a pair of shaft members that are to be aligned with each other, a block body for carrying the indicator and adapted to be removably-positioned on the other shaft, an open-end bore in said block body, winding means rotatably-mounted in said bore, a strap member secured at one end on said winding means and having an opposite end extending from said block body to encircle the other shaft, said block body having a transverse slot portion, pin means secured to the other end of said strap member for endwise insertion into and removal from said slot portion to define a loop about the other shaft, said slot portion having means for retaining said pin means therein against outward pull by said strap member, said winding means having a knob for rotating it in opposite directions to wind up and unwind said strap member for decreasing and increasing the size of said loop, stem means operatively-mounted to extend within said block into engagement with said winding means for locking it against unwinding rotation in a position at which said strap member is in a tight clamping relation about the other shaft for holding said block body in a secure position therein, and said stem means having manual means for moving it out of engagement with said winding means whereby said winding means may be unwound to release the holding action of said strap member with respect to the other shaft.

References Cited by the Examiner
UNITED STATES PATENTS

| 1,720,648 | 7/1929 | Hallett | 74—458 |
| 2,451,702 | 10/1948 | Weigand | 269—131 |
| 2,499,011 | 2/1950 | Weeks | 248—23 |
| 2,545,784 | 3/1951 | Kenner | 248—230 |
| 2,815,582 | 12/1957 | Kerstens | 33—180 |
| 2,833,051 | 5/1958 | Cunningham | 33—180 |
| 3,012,750 | 12/1961 | Schermerhorn | 248—231 |

CLAUDE A. LE ROY, *Primary Examiner.*

W. D. LOULAN, *Assistant Examiner.*